United States Patent
Toya et al.

(10) Patent No.: US 10,536,008 B2
(45) Date of Patent: Jan. 14, 2020

(54) POWER STORAGE SYSTEM AND POWER STORAGE SYSTEMS CONTROL METHOD

(71) Applicant: Panasonic Intellectual Property Management Co., Ltd., Osaka (JP)

(72) Inventors: Shoichi Toya, Hyogo (JP); Motoshi Ito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 247 days.

(21) Appl. No.: 15/588,983

(22) Filed: May 8, 2017

(65) Prior Publication Data

US 2017/0244260 A1   Aug. 24, 2017

Related U.S. Application Data

(62) Division of application No. 14/368,520, filed as application No. PCT/JP2013/006120 on Oct. 15, 2013, now Pat. No. 9,680,334.

(30) Foreign Application Priority Data

Oct. 31, 2012   (JP) .................. 2012-240938

(51) Int. Cl.
   *H02J 7/34*   (2006.01)
   *G06F 1/30*   (2006.01)
   (Continued)

(52) U.S. Cl.
   CPC ............ *H02J 7/0021* (2013.01); *H02J 7/007* (2013.01); *H02J 7/022* (2013.01); *H02J 7/35* (2013.01);
   (Continued)

(58) Field of Classification Search
   CPC ... H02B 1/42; H02J 9/06; H02J 7/0045; H02J 7/022; H02J 9/061; H02J 7/35;
   (Continued)

(56) References Cited

U.S. PATENT DOCUMENTS 7,528,572 B2   5/2009  Masias
7,602,073 B2   10/2009 Meyers
(Continued)

FOREIGN PATENT DOCUMENTS

JP   02-41603    3/1990
JP   2001-258176 9/2001
(Continued)

OTHER PUBLICATIONS

International Search Report dated Dec. 10, 2013 in International (PCT) Application No. PCT/JP2013/006120.

*Primary Examiner* — Alfonso Perez Borroto
*Assistant Examiner* — Esayas G Yeshaw
(74) *Attorney, Agent, or Firm* — Wenderoth, Lind & Ponack, L.L.P.

(57) ABSTRACT

A distribution board includes: a pack housing unit which houses a battery pack and includes a connecting unit; and a charge control unit. The battery pack includes a connecting terminal unit for charge and discharge of power and can supply power to the distribution board and another device different from the distribution board. The connecting unit is connectable to and disconnectable from the connecting terminal unit. The charge control unit converts AC power supplied from a power system into DC power, and supplies the DC power to the battery pack housed in the pack housing unit to charge the battery pack.

17 Claims, 12 Drawing Sheets

(51) Int. Cl.
   *H02J 7/00*   (2006.01)
   *H02J 7/35*   (2006.01)
   *H02J 9/06*   (2006.01)
   *H02J 7/02*   (2016.01)
   *H02J 11/00*  (2006.01)
   *H02B 1/42*   (2006.01)

(52) U.S. Cl.
   CPC ............... *H02J 9/06* (2013.01); *H02J 9/061* (2013.01); *H02J 11/00* (2013.01); *H02B 1/42* (2013.01); *H02J 7/0045* (2013.01); *Y02B 10/72* (2013.01); *Y10T 307/625* (2015.04)

(58) Field of Classification Search
   CPC .......... H02J 7/0021; H02J 7/007; H02J 11/00; Y10T 307/625; Y02B 10/72
   See application file for complete search history.

(56) References Cited

U.S. PATENT DOCUMENTS

| | | | |
|---|---|---|---|
| 2005/0121979 A1 | 6/2005 | Matsumoto et al. | |
| 2006/0202559 A1 | 9/2006 | Hashimoto et al. | |
| 2010/0110731 A1 | 5/2010 | Murai | |
| 2011/0014501 A1 | 1/2011 | Scheucher | |
| 2011/0148195 A1 | 6/2011 | Lee | |
| 2011/0296218 A1* | 12/2011 | Kim | H02J 3/32 713/323 |
| 2012/0094706 A1* | 4/2012 | Fukumoto | H04W 72/048 455/512 |
| 2012/0205975 A1* | 8/2012 | Takehara | G06F 1/189 307/23 |
| 2012/0205985 A1 | 8/2012 | Inakagata | |
| 2012/0215468 A1 | 8/2012 | Geris | |
| 2012/0217809 A1* | 8/2012 | Sato | H02J 9/062 307/64 |
| 2013/0069429 A1 | 3/2013 | Yang | |
| 2013/0154570 A1* | 6/2013 | Nomura | H02J 3/32 320/128 |
| 2013/0221926 A1 | 8/2013 | Furtner | |
| 2013/0326237 A1 | 12/2013 | Holdengreber | |
| 2014/0017528 A1 | 1/2014 | Uehara | |
| 2014/0050948 A1 | 2/2014 | Hashimoto | |
| 2014/0191705 A1 | 7/2014 | Takao | |

FOREIGN PATENT DOCUMENTS

| | | |
|---|---|---|
| JP | 2002-369380 | 12/2002 |
| JP | 2005-176461 | 6/2005 |
| JP | 2006-197748 | 7/2006 |
| JP | 2006-254537 | 9/2006 |
| JP | 2007-043802 | 2/2007 |
| JP | 2007-228727 | 9/2007 |
| JP | 2008-22650 | 1/2008 |
| JP | 2008-099527 | 4/2008 |
| JP | 2009-89572 | 4/2009 |
| JP | 2009-201275 | 9/2009 |
| JP | 2010-115008 | 5/2010 |
| JP | 2011-083045 | 4/2011 |
| JP | 2011-188607 | 9/2011 |
| JP | 3171974 | 11/2011 |
| JP | 2012-143046 | 7/2012 |
| JP | 2012-174466 | 9/2012 |

\* cited by examiner

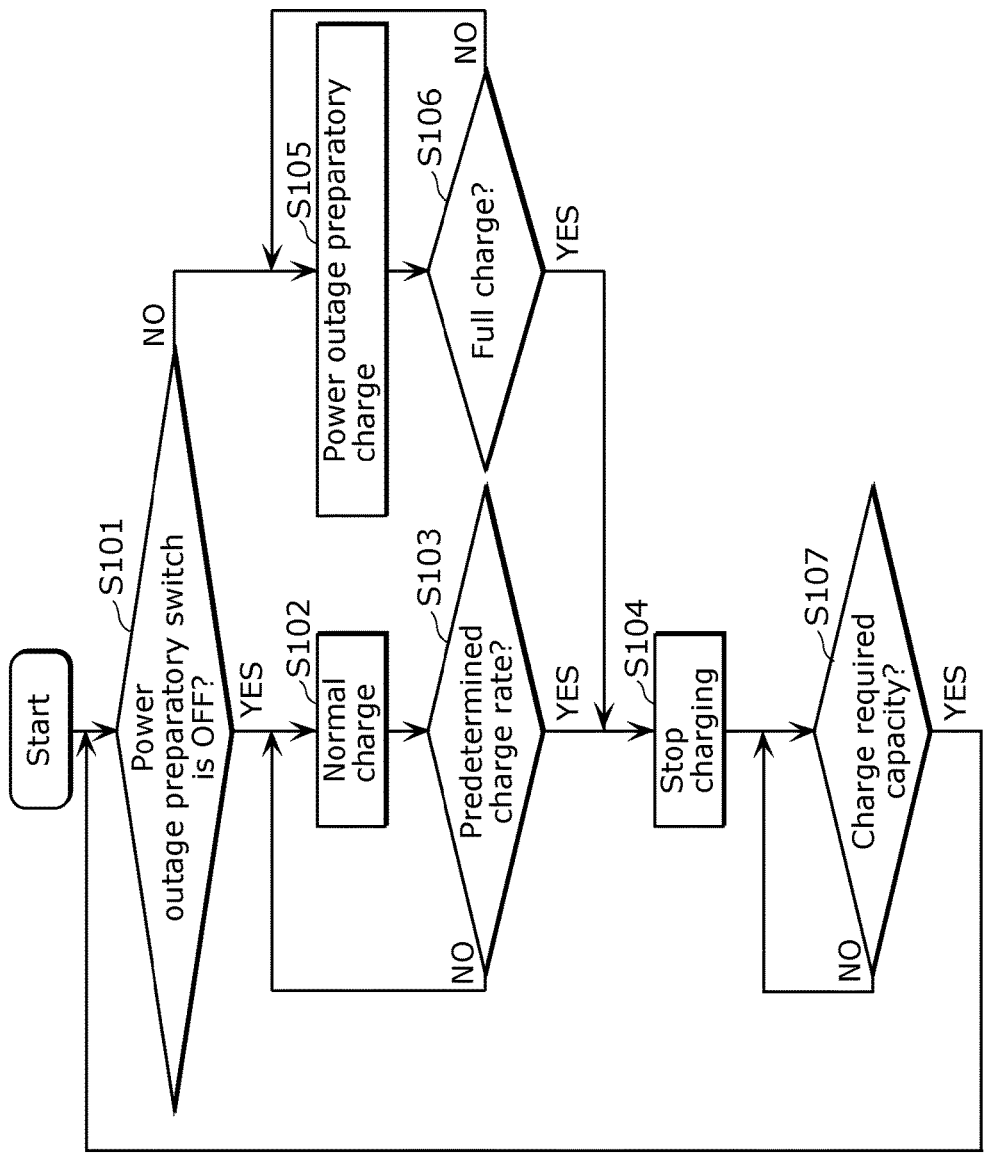

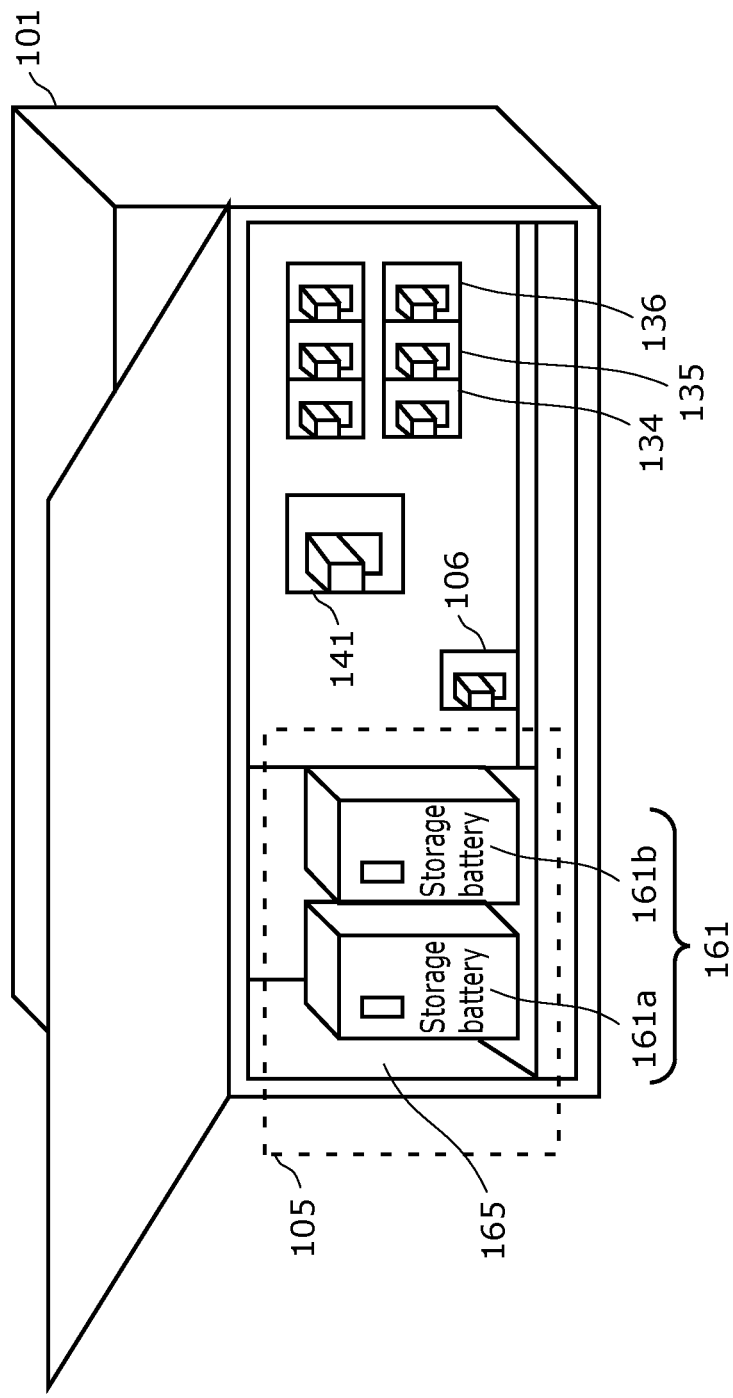

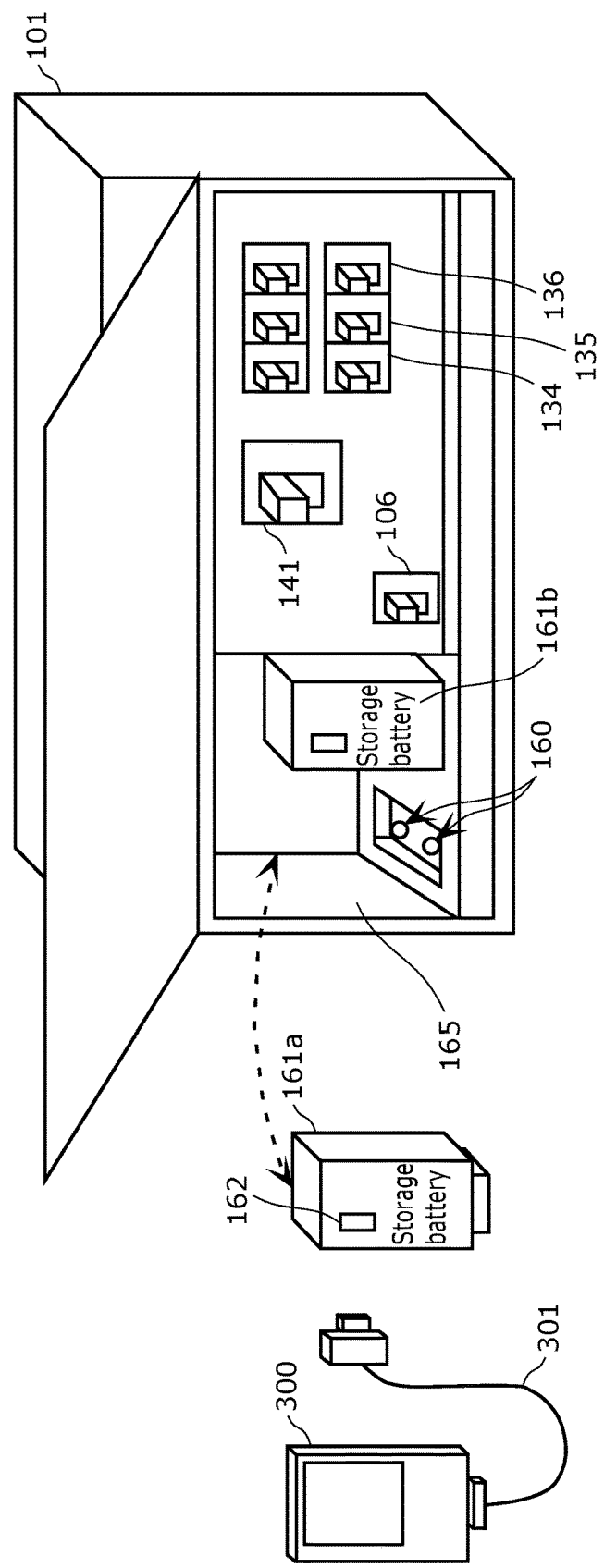

POWER STORAGE SYSTEM AND POWER STORAGE SYSTEMS CONTROL METHOD

TECHNICAL FIELD

The present invention relates to a distribution board which controls supply of electric power that is supplied from a power system, to a load in a building, and a battery pack to be connected to the distribution board.

BACKGROUND ART

Recent years have seen a widespread use of a photovoltaics (PV) system, a fuel cell (FC) and the like also in conventional homes. Patent Literature (PTL) 1 discloses a self-sustained operation assist device which enables self-sustained operation of a fuel cell system during power outage.

CITATION LIST

Patent Literature

[PTL 1] Japanese Unexamined Patent Application Publication No. 2008-22650

SUMMARY OF INVENTION

Technical Problem

However, switching to the self-sustained state in which no electric power (hereinafter, electric power is simply referred to as power) from a power system is used requires installation of various kinds of devices and appropriate control thereof. Although such control requires power, the conventional technique cannot secure sufficient power for operating the distribution board during power outage.

In addition, even if power for operating the distribution board is secured, for example, the conventional technique also has a problem in that use of the secured power is limited.

In view of the above, the present invention provides a distribution board and the like which can secure sufficient power for operating the distribution board itself during power outage.

The present invention also provides a distribution board and the like which have wider use of power secured for operating the distribution board itself.

Solution to Problem

A distribution board according to one aspect of the present invention is a distribution board which controls supply of electric power to a load in a building, the electric power being supplied from a power system. The distribution board includes: a pack housing (pack housing unit) which houses a battery pack and includes a connecting unit, the battery pack including a connecting terminal unit for charge and discharge of electric power and being capable of supplying electric power to the distribution board and a device different from the distribution board, the connecting unit being connectable to and disconnectable from the connecting terminal unit; and a charge controller which converts AC power supplied from the power system into DC power, and supplies the DC power to the battery pack housed in the pack housing to charge the battery pack.

Advantageous Effects of Invention

According to the present invention, it is possible to secure sufficient power for operating a distribution board during power outage. The present invention also allows wider use of the power secured for operating the distribution board itself.

BRIEF DESCRIPTION OF DRAWINGS

FIG. 3 is a flowchart of an operation performed when a power storage unit is charged by using power supplied from a power system according to Embodiment 1.

FIG. 8A is a perspective view of an external appearance of a main distribution board according to Embodiment 3 where two storage batteries are housed.

FIG. 8B is a perspective view of an external appearance of the main distribution board according to Embodiment 3 where one of the storage batteries has been removed.

Figure 1:
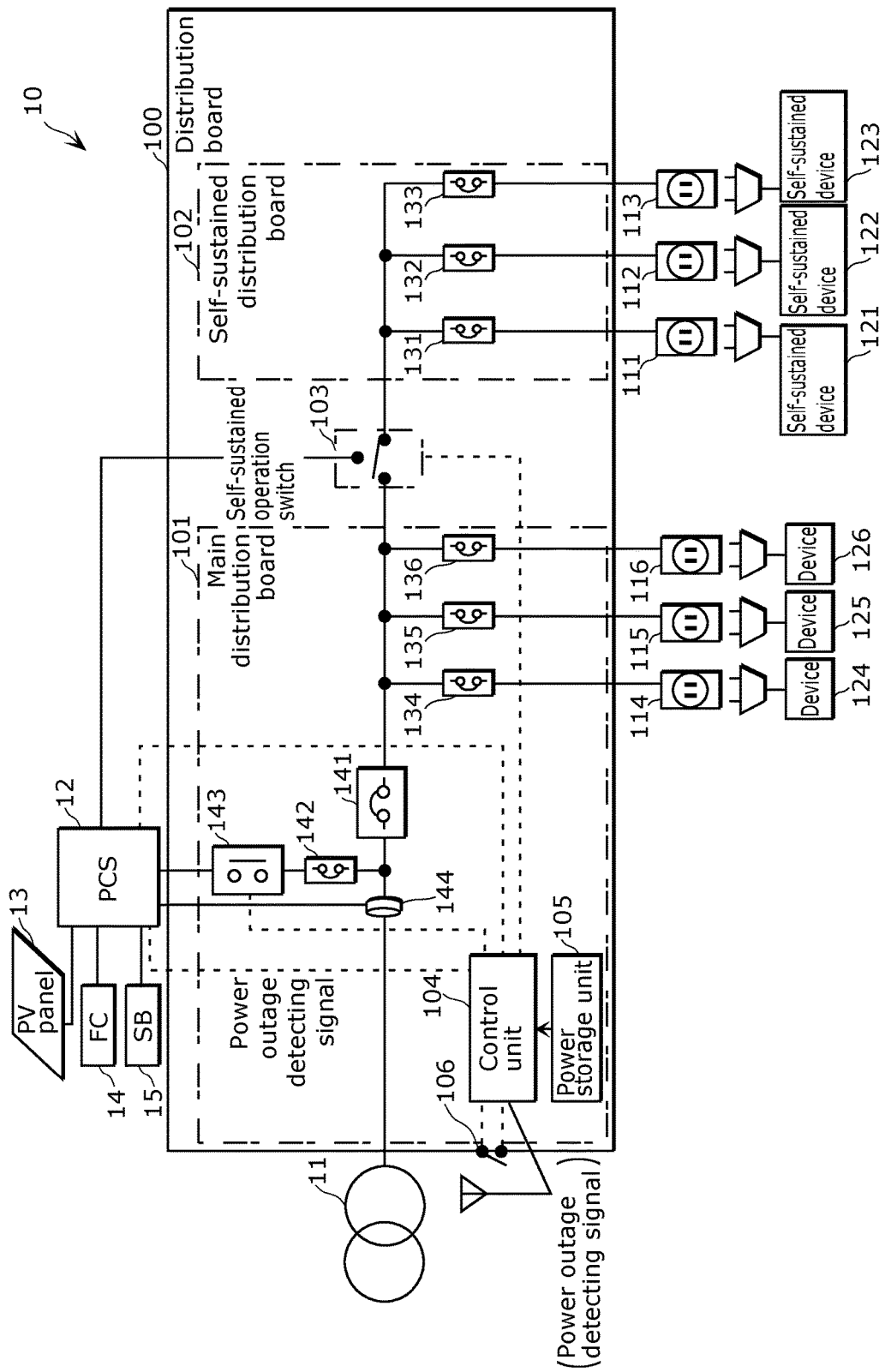
FIG. 1 illustrates a configuration of a power supply system which includes a distribution board according to Embodiment 1.

DESCRIPTION OF EMBODIMENTS (Underlying Knowledge Forming Basis of the Present Invention)

In order to cope with the problem in that insufficient power is secured for operating the distribution board during power outage described in the "Technical Problem" section, the inventors assumed a case where the distribution board included a storage battery. The inventors, however, found out that the distribution board including the storage battery has a problem below.

In general, power outage in which no power is supplied from a power system does not frequently happen, but happens only infrequently. Constantly keeping the storage battery at full charge in preparation for such power outage is likely to degrade performance of the storage battery, which results in a reduction in lifetime of the storage battery.

Furthermore, simply including the storage battery in the distribution board limits use of the power in the storage battery.

In order to solve such problems, a distribution board according to one aspect of the present invention is a distribution board which controls supply of electric power to a load in a building, the electric power being supplied from a power system. The distribution board includes: a pack housing which houses a battery pack and includes a connecting unit, the battery pack including a connecting terminal unit for charge and discharge of electric power and being capable of supplying electric power to the distribution board and a device different from the distribution board, the connecting unit being connectable to and disconnectable from the connecting terminal unit; and a charge controller which converts AC power supplied from the power system into DC power, and supplies the DC power to the battery pack housed in the pack housing to charge the battery pack.

With this, for example, during power outage, a battery pack can be removed from the distribution board to be carried to a place which needs the battery pack. Then, for example, power can be supplied from the battery pack to other devices such as a smart phone or tablet terminal.

Furthermore, it may be that the load includes a plurality of loads including a normal load and an emergency load, and the distribution board further includes: a discharge controller which converts, into AC power, the DC power in the battery pack supplied via the connecting unit, and supplies the AC power to the load; and a switching controller which switches between a grid connection mode and a self-sustained operation mode, the grid connection mode being a mode in which the AC power supplied from the power system is supplied to at least the normal load, the self-sustained operation mode being a mode in which electric power charged in the battery pack connected to the connecting unit is supplied to at least the emergency load via the discharge controller.

With this, for example, during power outage and the like, power charged in the battery pack can be supplied at least to an emergency load.

It may also be that the battery pack includes a display which displays a remaining power level of the battery pack, and the pack housing houses the battery pack in an orientation that allows the display of the battery pack connected to the connecting unit to be viewed.

With this, it is possible to easily check the remaining power level of the battery pack.

It may also be that the distribution board includes a plurality of the pack housings and a plurality of the battery packs are housed in the distribution board.

It may also be that when at least one of the battery packs is removed while electric power is supplied from the battery packs to the emergency load, the switching controller continuously supplies electric power to the emergency load by using the battery packs excluding the at least one battery pack that has been removed.

With this, for example, even when one battery pack is removed during power outage and the like, it is possible to continuously supply power to an emergency load by using the remaining battery packs.

Furthermore, it may be that the distribution board further includes a detector which detects whether or not electric power is being supplied from the power system, wherein the switching controller selects the grid connection mode when the detector detects that electric power is being supplied from the power system to the distribution board, and selects the self-sustained operation mode when the detector detects that no electric power is being supplied from the power system to the distribution board.

With this, it is possible to switch to a self-sustained operation mode at the time of power outage, and switch to a grid connection mode when power is restored.

It may also be that the distribution board further includes a mode switch (switch) for selecting the grid connection mode or the self-sustained operation mode, wherein the switching controller switches between the grid connection mode and the self-sustained operation mode according to the mode selected by the mode switch.

It may also be that the distribution board further includes a signal receiver which externally receives a signal, wherein the switching controller switches between the grid connection mode and the self-sustained operation mode according to the signal by the signal receiving unit.

It may also be that the signal obtained by the signal receiver is a control signal indicating which one of the grid connection mode and the self-sustained operation mode is to be selected, and the switching controller switches between the grid connection mode and the self-sustained operation mode according to the mode indicated by the control signal.

It may also be that wherein the signal received by the signal receiver is a power saving request signal, and the switching controller switches from the grid connection mode to the self-sustained operation mode when the signal receiver receives the power saving request signal.

With this, it is possible to switch between the self-sustained operation mode and the grid connection mode according to various states, such as manual operation, operation by a remote control, control from another device, or external request.

Furthermore, it may be that the charge controller obtains information about a remaining power level of the battery pack by communicating with the battery pack, and when the remaining power level is below a predetermined threshold value in the grid connection mode, the charge controller charges the battery pack by supplying, to the battery pack, the electric power supplied from the power system, and when the remaining power level is above or equal to the predetermined threshold value, the charge controller stops supplying, to the battery pack, the electric power supplied from the power system.

With this, it is possible to control charge of the battery pack according to the remaining power level of the battery pack.

It may also be that the battery pack includes a universal serial bus (USB) port, and the electric power charged in the battery pack is supplied to the device via the USB port in a state where the battery pack is removed from the connecting unit.

With this, power can be supplied from the battery pack to other devices such as a smart phone or tablet terminal which includes a USB port.

It may also be that the battery pack is removably connected to the device via the connecting terminal unit, and the electric power charged in the battery pack is supplied to the device via the connecting terminal unit.

With this, power can be supplied from the battery pack to another device which includes a terminal compatible with a connection terminal.

Furthermore, a battery pack according to one aspect of the present invention is a battery pack to be connected to a distribution board which supplies, to a load, electric power supplied from a power system. The battery pack includes: one or more storage batteries; a connecting terminal unit for charge and discharge of electric power, the connecting terminal unit being mechanically and electrically connectable to and disconnectable from the distribution board; a charge circuit which charges the one or more storage batteries by using the electric power supplied from the power system via the connecting terminal unit; a discharge circuit which outputs electric power discharged from the one or more batteries; and a power supplier which supplies, to a device different from the distribution board, the electric power output from the discharge circuit, by being electrically connected to the device.

With this, for example, during power outage and the like, the battery pack can be removed from the distribution board to be carried to a place which needs the battery pack. Then, for example, power can be supplied from the battery pack to other devices such as a smart phone or tablet terminal.

It may also be that the battery pack is connectable to and disconnectable from the device via the connecting terminal unit, and the discharge circuit outputs, to the device via the connecting terminal unit, the electric power discharged from the one or more storage batteries, by the connecting terminal unit being electrically connected to the device.

With this, power can be supplied from the battery pack to another device which includes a terminal compatible with a connection terminal.

It may also be that the power supplier is formed as a universal serial bus (USB) port, the device is connected to the USB port, and the discharge circuit supplies, to the device via the USB port, the electric power discharged from the one or more storage batteries.

With this, power can be supplied from the battery pack to other devices such as a smart phone or tablet terminal which includes an USB port.

A distribution board according to one aspect of the present invention is a distribution board which controls supply of power that is supplied from a power system, to a load in a building. The distribution board includes a power storage unit and a charge control unit (AC/DC converter). The power storage unit supplies power for operating the distribution board during power outage in which no power is supplied from the power system. When the charge control unit charges the power storage unit by using power from the power system, the charge control unit charges the power storage unit by switching between normal charge and power outage preparatory charge. In the normal charge, it is controlled such that the power storage unit is charged to a predetermined first rate that is lower than the total charge capacity at full charge of the power storage unit. In the power outage preparatory charge, it is controlled such that the power storage unit is charged to a predetermined second rate that is higher than the first rate in the normal charge.

With this, it is possible to secure sufficient power for operating the distribution board during power outage in which no power is supplied from a power system. It is controlled in the normal charge such that the power storage unit is charged to the predetermined first rate that is lower than the total charge capacity at full charge. Hence, it is possible to prevent performance and lifetime of the power storage unit from degrading, leading to a longer lifetime of the power storage unit. This is because keeping the power storage unit at full charge (or at zero charge capacity) degrades performance and lifetime of the power storage unit. In addition, by switching between the normal charge and the power outage preparatory charge as necessary, it is possible to prevent performance and lifetime of the power storage unit from degrading, and is also possible to secure sufficient power for operating the distribution board when necessary.

It may also be that the charge control unit charges the power storage unit to the total charge capacity in the power outage preparatory charge.

With this, control for suppressing charge is not necessary in the power outage preparatory charge, and sufficient power can be secured for operating the distribution board when necessary.

Furthermore, it may also be that the distribution board further includes a power outage preparatory switch for switching between the normal charge and the power outage preparatory charge. It may be that when the power outage preparatory switch is turned on, the charge control unit switches into the power outage preparatory charge to charge the power storage unit, and when the power outage preparatory switch is turned off, the charge control unit switches into the normal charge to charge the power storage unit.

With this, a user can easily switch between the normal charge and the power outage preparatory charge depending on the situation.

It may also be that the charge control unit turns off the power outage preparatory switch when charge of the power storage unit in the power outage preparatory charge is completed.

With this, it is possible to prevent the user from forgetting turning off the power outage preparatory switch, that is, from forgetting switching back to the normal charge.

Furthermore, it may be that the distribution board further includes a power outage information obtaining unit which obtains power outage information indicating a schedule of power outage via a network. It may be that when the power outage information obtaining unit obtains the power outage information, the charge control unit switches into the power outage preparatory charge to charge the power storage unit, and when the power outage information obtaining unit does not obtain the power outage information, the charge control unit switches into the normal charge to charge the power storage unit.

With this, by switching between the normal charge and the power outage preparatory charge according to the power outage information as necessary, it is possible to prevent performance and lifetime of the power storage unit from degrading, and to secure sufficient power for operating the distribution board when necessary.

It may also be that the power storage unit includes a plurality of storage batteries, and at least one of the storage batteries is removable from the distribution board.

With this, for example, during power outage, a storage battery can be removed from the distribution board to be carried to a place which needs the storage battery.

It may also be that the distribution board further includes a detecting unit (detector) and a control unit (controller). The detecting unit supplies, to the load, power that is supplied from an external power supply device, and detects the power outage. When the detecting unit detects the power outage, the control unit blocks flow of the power that is supplied from the power supply device, to the power system, by using the power supplied from the power storage unit.

With this, at the time of power outage and the like, it is possible to switch between power supplied from the power system and power supplied from the power supply device, and to block the flow of power that is supplied from the power supply device, to the power system. As a result, it is possible to stabilize power supply to the load.

These general or generic aspects may be implemented using a system, a method, an integrated circuit, a computer program, or a computer-readable recording medium such as a CD-ROM, or any combination of systems, methods, integrated circuits, computer programs, and computer-readable recording media.

Hereinafter, descriptions are given of embodiments with reference to the accompanying Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the present invention. Among the structural elements in the following embodiments, structural elements not recited in any one of the independent claims are described as arbitrary structural elements.

Embodiment 1

FIG. 1 illustrates a configuration of a power supply system which includes a distribution board according to Embodiment 1.

A power supply system 10 illustrated in FIG. 1 supplies power to devices (normal loads) 124 to 126 and self-sustained devices (emergency loads) 121 to 123. Hereinafter, specific descriptions are given of each structural element illustrated in FIG. 1.

A distribution board 100 is a distribution board which controls supply, to the loads (devices 124 to 126 and self-sustained devices 121 to 123) in a building, power that is supplied from a power system 11 and power supply devices such as a photovoltaic panel (PV panel) 13, a fuel cell (FC) 14, and a storage battery (SB) 15. In particular, the distribution board 100 supplies power to the self-sustained devices 121 to 123 even when no power is supplied from the power system 11. The distribution board 100 includes, as illustrated in FIG. 1, a main distribution board 101, a self-sustained distribution board 102, and a self-sustained operation switch 103.

The main distribution board 101 includes a branch circuit, and controls supply, to the devices 124 to 126, power that is supplied from the power system 11, the photovoltaic panel 13, the fuel cell 14, and the storage battery 15. The main distribution board 101 includes a control unit 104, a power storage unit 105, a power outage preparatory switch 106, breakers 134 to 136 and 142, a main breaker 141, a relay 143, and a current transformer (CT) 144.

The self-sustained distribution board 102 is an additional distribution board which includes a branch circuit, and supplies power, to the self-sustained devices 121 to 123, power that is supplied via the self-sustained operation switch 103. In other words, the self-sustained distribution board 102 supplies, to the self-sustained devices 121 to 123, power that is supplied from the photovoltaic panel 13, the fuel cell 14, and the storage battery 15. In particular, the self-sustained distribution board 102 supplies power to the self-sustained devices 121 to 123 even when no power is supplied from the power system 11. The self-sustained distribution board 102 includes breakers 131 to 133.

The self-sustained operation switch 103 is a switch for switching between supply of power from the power system 11 and the power supply devices and supply of power only from the power supply devices. For example, while power is supplied from the power system 11, power from the power system 11 and the power supply devices are supplied. On the other hand, while no power is supplied from the power system 11, only power from the power supply devices is supplied.

The control unit 104 detects power outage and controls an operation of the distribution board 100 as described later.

The power storage unit 105 is, for example, a storage battery, and charges power that is supplied from the power system 11. The power storage unit 105 supplies power to each structural element included in the distribution board 100 during power outage. The power storage unit 105 may charge power that is supplied from the photovoltaic panel 13, the fuel cell 14, and the storage battery 15 during power outage.

The power outage preparatory switch 106 is a switch for switching between normal charge and power outage preparatory charge. For example, when information from a power company or the like indicates possible power outage, a user turns on the power outage preparatory switch 106 to switch into the power outage preparatory charge.

The relay 143 is one kind of switch, and opens and closes an electric circuit according to an electric signal. More specifically, a switch control circuit 153 turns on or off the relay 143. When the relay 143 is turned on, the relay 143 switches the connection state into a conducting state, and when the relay 143 is turned off, the relay 143 switches the connection state into a non-conducting state.

The breakers 131 to 136 and 142 and the main breaker 141 break the circuit when overcurrent, leak or the like is detected. The current transformer 144 is a sensor for measuring current at the main distribution board 101.

The power system 11 is a power supply system provided by a power company. The photovoltaic panel 13 and the fuel cell 14 may supply unstable and insufficient power. Hence, the power system 11 is used even when the photovoltaic panel 13 and the fuel cell 14 are used.

A power conditioner (PCS) 12 adjusts power supplied from the photovoltaic panel 13 and the fuel cell 14. For example, the power conditioner 12 adjusts power supplied from the photovoltaic panel 13 and the fuel cell 14 from DC to AC. The power conditioner 12 adjusts power to be supplied to the storage battery 15 or power that is supplied from the storage battery 15. For example, the power conditioner 12 converts power to be supplied to the storage battery 15 from AC to DC, and converts power that is supplied from the storage battery 15 from DC to AC. The power conditioner 12 also supplies power to the main distribution board 101 according to the state of current measured by the current transformer 144.

The photovoltaic panel 13 is also referred to as a solar panel, solar cell panel, or solar cell module, and generates power using sunlight. For example, the photovoltaic panel 13 includes a plurality of solar cells arranged in a panel form.

The fuel cell 14 generates power using chemical reaction of fuel. For example, the fuel cell 14 generates power by reaction of hydrogen and oxygen.

The storage battery 15 stores power supplied from the power system 11, the photovoltaic panel 13, and the fuel cell 14.

Self-sustained outlets 111 to 113 are interfaces for connecting the self-sustained devices 121 to 123 to the power supply system 10. Even when no power is supplied from the power system 11, power from the photovoltaic panel 13 and the like is supplied to the self-sustained outlets 111 to 113.

Outlets 114 to 116 are interfaces for connecting the devices 124 to 126 to the power supply system 10. When no power is supplied from the power system 11, no power is supplied to the outlets 114 to 116.

The self-sustained devices 121 to 123 are devices which operate by using power that is supplied, and, for example, are home electrical appliances to which power is to be constantly supplied. A major example is a refrigerator.

The devices 124 to 126 are devices which operate by using power that is supplied, and, for example, are home electric appliances which allow stop of power supply. A major example is an illumination apparatus in a room that is not frequently used.

Figure 2:
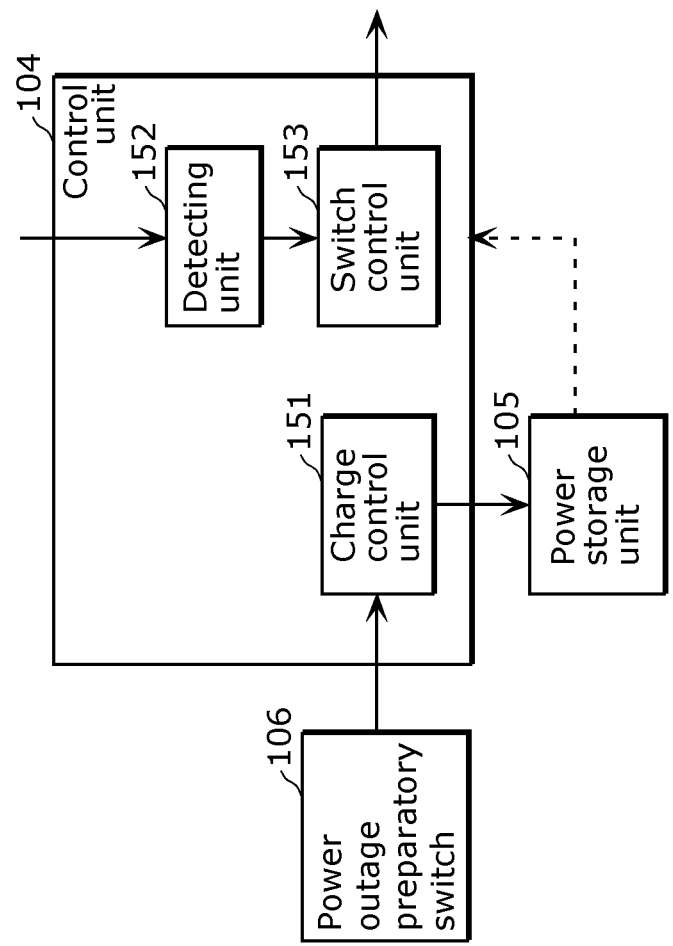
FIG. 2 is a block diagram illustrating a detailed configuration of a control unit in the distribution board according to Embodiment 1.

Next, a description is given of a detailed configuration of the control unit 104. FIG. 2 is a block diagram illustrating a detailed configuration of the control unit 104 in the distribution board 100 according to Embodiment 1.

The control unit 104 includes, as illustrated in FIG. 2, a charge control unit 151, a detecting unit 152, and a switch control unit 153.

When the charge control unit 151 charges the power storage unit 105 by using power supplied from the power system 11, the charge control unit 151 charges the power storage unit 105 by switching between normal charge and power outage preparatory charge. In the normal charge, it is controlled such that the power storage unit 105 is charged to a predetermined charge rate (first rate) that is lower than the total charge capacity at full charge of the power storage unit 105. In the power outage preparatory charge, it is controlled such that the power storage unit 105 is charged to the total charge capacity. When the power outage preparatory switch 106 is turned on, the charge control unit 151 switches into the power outage preparatory charge to charge the power storage unit 105. When the power outage preparatory switch 106 is turned off, the charge control unit 151 switches into the normal charge to charge the power storage unit 105.

The detecting unit 152 detects power outage that is a state where no power is supplied from the power system 11.

The switch control circuit 153 controls the relay 143 and the self-sustained operation switch 103 based on the information detected by the detecting unit 152.

Specific descriptions are given below of an operation of the power supply system 10 performed when power supplied from the power system 11 and the power supply devices is supplied and when only power supplied from the power supply devices is supplied.

First, when power supplied from the power system 11 and the power supply devices is supplied, the power system 11 supplies power to the main distribution board 101. The photovoltaic panel 13 and the fuel cell 14 also supply power to the main distribution board 101 via the power conditioner 12. Furthermore, power is supplied via the power conditioner 12 from the main distribution board 101 to the storage battery 15, or from the storage battery 15 to the main distribution board 101.

The main distribution board 101 supplies power to the devices 124 to 126. The main distribution board 101 also supplies power to the self-sustained distribution board 102 via the self-sustained operation switch 103. The self-sustained distribution board 102 supplies power to the self-sustained devices 121 to 123.

On the other hand, when only power supplied from the power supply devices is supplied, the photovoltaic panel 13, the fuel cell 14, and the storage battery 15 do not supply power to the main distribution board 101.

The power conditioner 12 supplies power to the self-sustained distribution board 102 via the self-sustained operation switch 103. The self-sustained distribution board 102 supplies power to the self-sustained devices 121 to 123.

With the configuration and operation above, the power supply system 10 is capable of supplying power to the self-sustained devices 121 to 123 when power is supplied from the power system 11 and also when no power is supplied from the power system 11.

Next, a description is given of an operation performed in the distribution board 100 with the above configuration when the power storage unit 105 is charged by using power supplied form the power system 11.

Figure 4A:
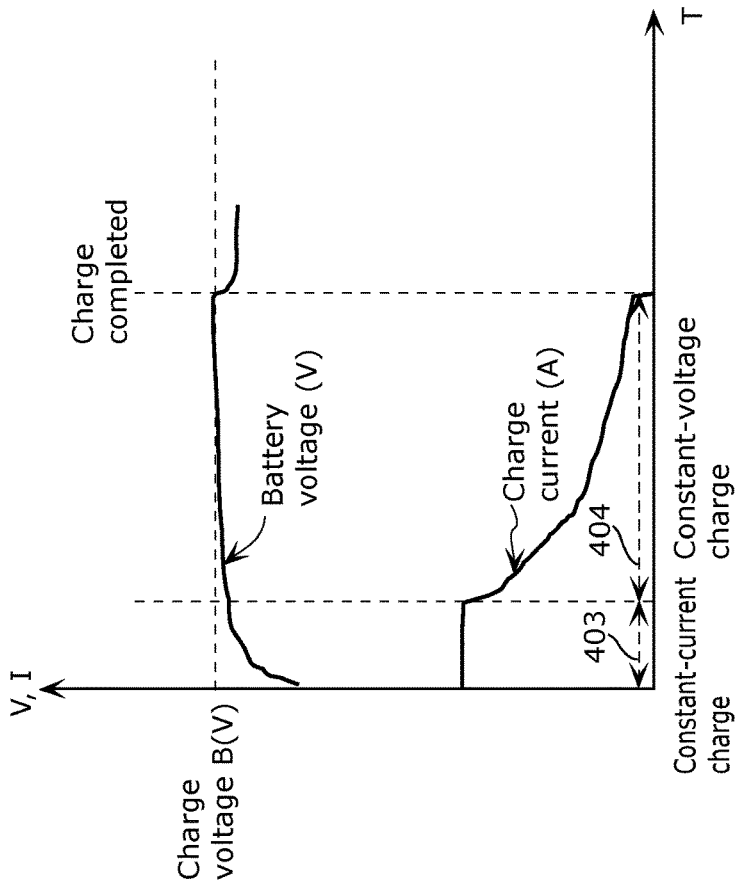
FIG. 4A illustrates charge characteristics in normal charge according to Embodiment 1.
Figure 4B:
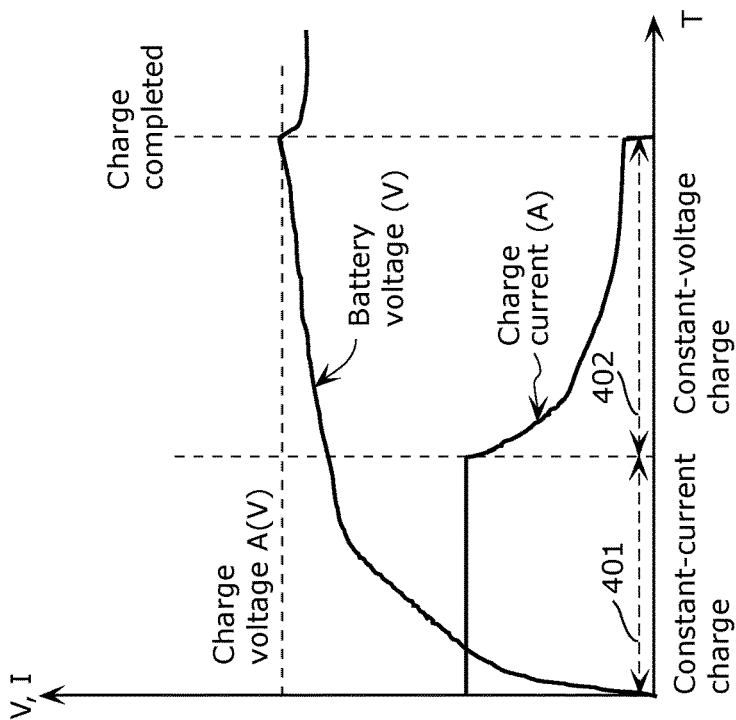
FIG. 4B illustrates charge characteristics in power outage preparatory charge according to Embodiment 1.

FIG. 3 is a flowchart of an operation performed when the power storage unit 105 is charged by using power supplied from the power system 11 according to Embodiment 1. FIG. 4A and FIG. 4B illustrate charge characteristics according to Embodiment 1. FIG. 4A illustrates the charge characteristics in normal charge, and FIG. 4B illustrates the charge characteristics in power outage preparatory charge.

The charge control unit 151 determines whether or not the power outage preparatory switch 106 is off (Step S101). When the determination result indicates that the power outage preparatory switch 106 is off (Yes in Step S101), the charge control unit 151 charges the power storage unit 105 in normal charge. In the normal charge, it is controlled such that the power storage unit 105 is charged to a predetermined charge rate (first rate) that is lower than the total charge capacity at full charge of the power storage unit 105 (Step S102). The charge control unit 151 performs constant voltage charge 402 at charge voltage A after constant current charge 401 as illustrated in FIG. 4A such that the power storage unit 105 is charged to a predetermined charge rate (for example, 70%) that is lower than the total charge capacity. The charge control unit 151 determines whether or not charge of the power storage unit 105 has reached the predetermined charge rate (first rate) (Step S103). When the charge has reached the predetermined charge rate (Yes in Step S103), the charge control unit 151 stops charging of the power storage unit 105 (Step S104). When the charge has not reached the predetermined charge rate (No in Step S103), the charge control unit 151 charges the power storage unit 105 in normal charge (Step S102).

On the other hand, when the power outage preparatory switch 106 is not off, that is, when the power outage preparatory switch 106 is on (No in Step S101), the charge control unit 151 charges the power storage unit 105 in power outage preparatory charge. In the power outage preparatory charge, the power storage unit 105 is charged to the total charge capacity (Step S105). The charge control unit 151 does not suppress charging, and performs constant voltage charge 404 at charge voltage B after performing the constant current charge 403 as illustrated in FIG. 4B such that the power storage unit 105 is charged to the total charge capacity. The charge control unit 151 determines whether or not charge of the power storage unit 105 has reached full charge (Step S106). When the charge has reached full charge (Yes in Step S106), the charge control unit 151 stops charging of the power storage unit 105 (Step S104). When the charge has not reached full charge (No in Step S106), the charge control unit 151 charges the power storage unit 105 in power outage preparatory charge (Step S105). Here, charge suppression is not performed and charge is performed till reaching the total charge capacity in the power outage preparatory charge. For example, it may be controlled such that the power storage unit 105 is charged to a predetermined charge rate (second rate: for example, 90%) that is higher than the predetermined charge rate (first rate: for example, 70%) in the normal charge.

The charge control unit 151 determines whether or not the charge capacity of the power storage unit 105 has decreased to the predetermined charge rate (for example, 50%) at which charge is necessary (Step S107). When the determination result indicates that the charge capacity has decreased to the predetermined charge rate (Yes in Step S107), processing is returned to the determination as to whether or not the power outage preparatory switch 106 is off (Step S101). On the other hand, when the charge capacity has not decreased to the predetermined charge rate (No in Step S107), determination as to whether or not the charge capacity has decreased to the predetermined charge rate is repeated.

In the flowchart, when the charge capacity has not reached the first rate (No in Step S103), the charge control unit 151 charges the power storage unit 105 in the normal charge till the charge capacity reaches the first rate; however, the present invention is not limited to the example. For example, when the charge capacity has not reached the first rate (No in Step S103), the processing may return to the determination as to whether or not the power outage preparatory switch 106 is off (Step S101). With this, even when the power outage preparatory switch 106 is turned on while the power storage unit 105 is being charged in the normal charge, the charge control unit 151 switches into the power outage preparatory charge to charge the power storage unit 105.

Next, a description is given of change in charge capacity of the power storage unit 105 in the normal charge, the power outage preparatory charge, and self-discharge.

Figure 5:
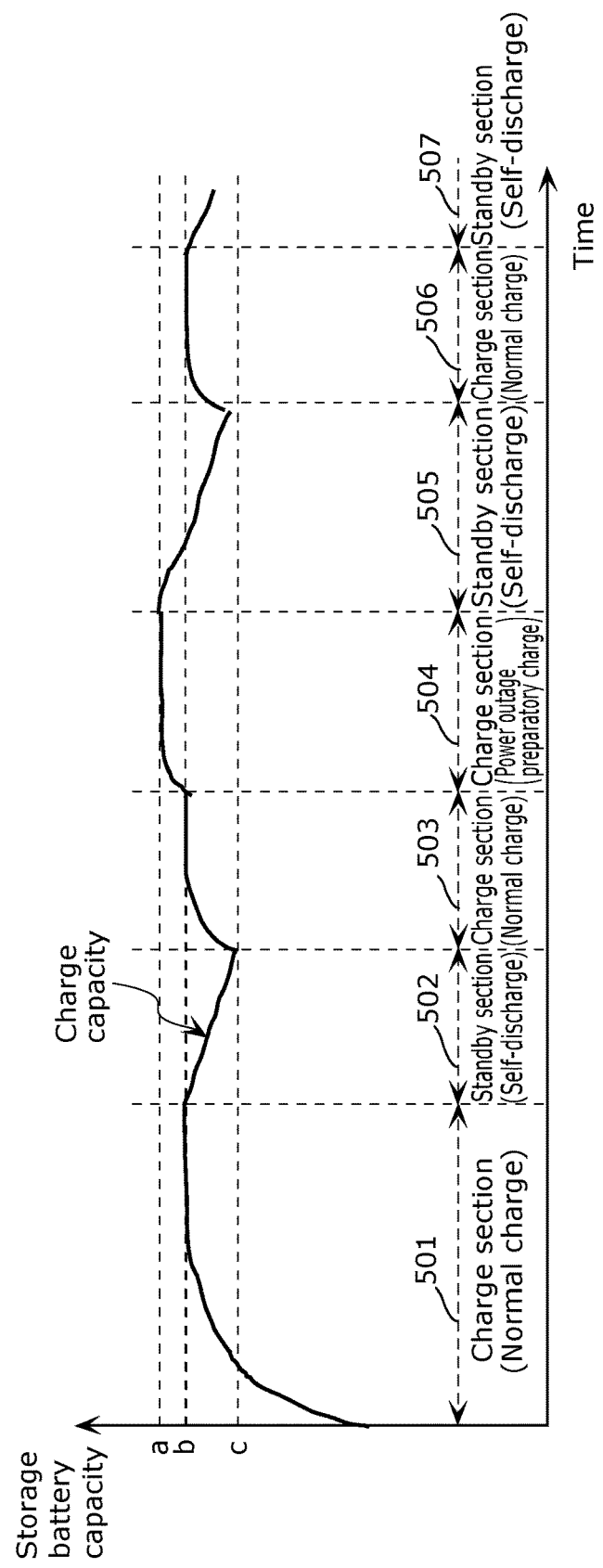
FIG. 5 illustrates an example of change in charge capacity in normal charge, power outage preparatory charge, and self-discharge according to Embodiment 1.

FIG. 5 illustrates an example of change in charge capacity in normal charge, power outage preparatory charge, and self-discharge according to Embodiment 1.

In FIG. 5, when charge of the power storage unit 105 reaches a charge capacity b that is the first rate in the normal charge in a charge section 501, the charge control unit 151 stops charging of the power storage unit 105. In a standby section 502 in which no charge is performed, the power storage unit 105 performs self-discharge, and the charge capacity decreases. When the charge capacity decreases to a charge capacity c that is a predetermined charge rate at which charge is necessary, the charge control unit 151 start charging of the power storage unit 105 in the normal charge. Next, in a charge section 503, while the power storage unit 105 is being charged in the normal charge, and when the power outage preparatory switch 106 is turned on, the charge control unit 151 charges, in a charge section 504, the power storage unit 105 in the power outage preparatory charge in which the power storage unit 105 is charged till reaching the total charge capacity. In the charge section 504, when charge of the power storage unit 105 reaches the charge capacity a that is the total charge capacity in the power outage preparatory charge, the charge control unit 151 stops charging of the power storage unit 105. In the standby section 505 during which no charge is performed, the power storage unit 105 performs self-discharge. Here, it is assumed that the power outage preparatory switch 106 is turned off. In a standby section 505, when the charge capacity decreases to the charge capacity c that is a predetermined charge rate at which charge is necessary, the charge control unit 151 starts charging of the power storage unit 105 in the normal charge. In the charge section 506, when charge of the power storage unit 105 reaches the charge capacity b in the normal charge, the charge control unit 151 stops charging of the power storage unit 105. In a standby section 507 during which no charge is performed, the power storage unit 105 performs self-discharge.

As described above, since the distribution board includes the power storage unit, it is possible to secure sufficient power for operating the distribution board during power outage in which no power is supplied from the power system. In addition, switching is performed as necessary between the normal charge and the power outage preparatory charge. In the normal charge, charge of the power storage unit 105 is suppressed to a predetermined charge rate. In the power outage preparatory charge, charge is not suppressed and the power storage unit 105 is charged till reaching the total charge capacity. As a result, it is possible to prevent performance and lifetime of the power storage unit 105 from degrading, and to secure sufficient power for operating the distribution board when necessary.

In Embodiment 1, a user turns on and off the power outage preparatory switch 106, but the present invention is not limited to the example. For example, it may be that the user turns on the power outage preparatory switch 106 so that the charge control unit 151 charges the power storage unit 105 in the power outage preparatory charge, and when the charge of the power storage unit 105 is completed, the charge control unit 151 turns off the power outage preparatory switch 106. With this, it is possible to prevent the user from forgetting turning off the power outage preparatory switch, that is, from forgetting switching back to the normal charge.

Furthermore, when the charge control unit 151 determines failure, lifetime level or the like of the power storage unit 105, and when failure is detected or the determined lifetime level reaches a predetermined lifetime level, it may be that an alarm goes off.

Furthermore, it may be that the storage battery capacity c at which charge is restarted may be set to different values according to turn on and off of the power outage preparatory switch 106. For example, when c and c' represents the storage battery capacities at which charge is restarted when the power outage preparatory switch 106 is off and on, respectively, the values may be set such that $c<c'<b$ is satisfied.

Embodiment 2

In Embodiment 1, the charge control unit switches between the normal charge and the power outage preparatory charge according to turn-on and off of the power outage preparatory switch 106. In Embodiment 2, the charge control unit switches between the normal charge and the power outage preparatory charge according to power outage information obtained from a power company and the like in addition to the turn-on and off of the power outage preparatory switch 106. The configuration of the distribution board according to Embodiment 2 is substantially the same as that in Embodiment 1, and the control unit 104 is different from a control unit 200 in configuration.

Figure 6:
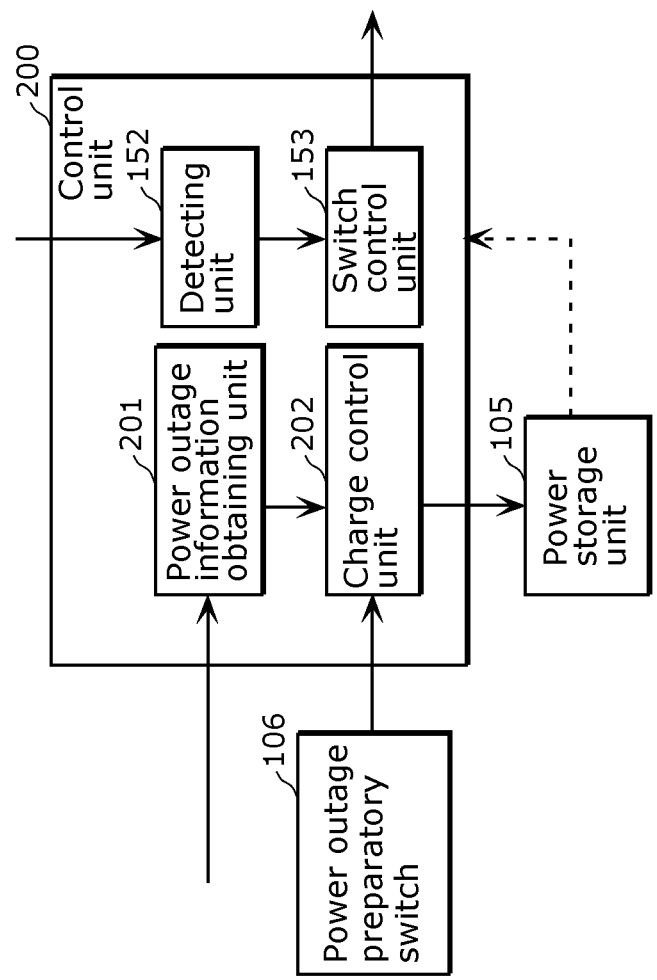
FIG. 6 is a block diagram illustrating a detailed configuration of a control unit in a distribution board according to Embodiment 2.

FIG. 6 is a block diagram illustrating a detailed configuration of the control unit 200 in a distribution board according to Embodiment 2. The same referential numbers are assigned to the structural elements that are substantially the same as those in Embodiment 1, and descriptions thereof are not given.

The control unit 200 includes, as illustrated in FIG. 6, a power outage information obtaining unit 201, a charge control unit 202, a detecting unit 152, and a switch control unit 153.

The power outage information obtaining unit 201 obtains power outage information indicating schedule of power outage from a power company and the like via a network.

When the charge control unit 202 charges the power storage unit 105 by using power supplied from the power system 11, the charge control unit 202 charges the power storage unit 105 by switching between normal charge and power outage preparatory charge. In the normal charge, it is controlled such that the power storage unit 105 is charged to a predetermined charge rate (first rate) that is lower than the total charge capacity at full charge of the power storage unit 105. In the power outage preparatory charge, the power storage unit 105 is charged till reaching the total charge capacity. When the power outage preparatory switch 106 is turned on, the charge control unit 202 switches into the power outage preparatory charge to charge the power storage unit 105. When the power outage preparatory switch 106 is turned off, the charge control unit 202 switches into the normal charge to charge the power storage unit 105. When the power outage information obtaining unit 201 obtains power outage information, the charge control unit 202 switches into the power outage preparatory charge to charge the power storage unit 105. When the power outage information obtaining unit 201 does not obtain the power outage information, the charge control unit 202 switches into the normal charge to charge the power storage unit 105.

Figure 7:
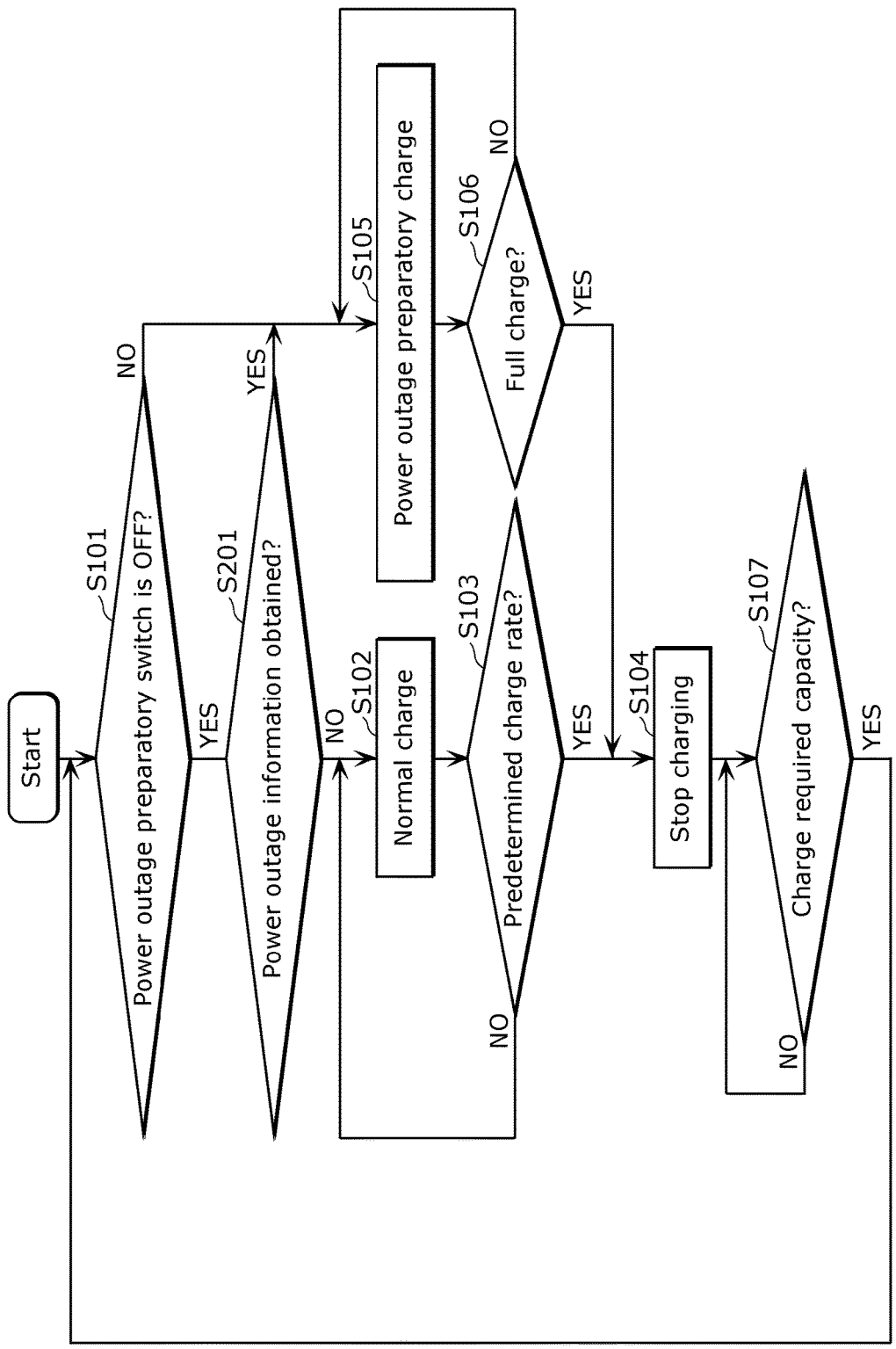
FIG. 7 is a flowchart of an operation performed when a power storage unit is charged by using power from a power system according to Embodiment 2.

FIG. 7 is a flowchart of an operation performed when the power storage unit 105 is charged by using power supplied from the power system 11 according to Embodiment 2.

The charge control unit 202 determines whether or not the power outage preparatory switch 106 is off (Step S101). When the determination result indicates that the power outage preparatory switch 106 is off (YES in Step S101), the charge control unit 202 determines whether or not the power outage information obtaining unit 201 has obtained the power outage information (Step S201). When the determination result indicates that the power outage information obtaining unit 201 has not obtained the power outage information (NO in Step S201), the charge control unit 202 charges the power storage unit 105 in normal charge in which the power storage unit 105 is charged at a predetermined charge rate (first rate) that is lower than the total charge capacity at full-charge of the power storage unit 105 (Step S102).

On the other hand, when the power outage preparatory switch 106 is not off, that is, when the power outage preparatory switch 106 is on (NO in Step S101) and when the power outage information obtaining unit 201 has obtained the power outage information (YES in Step S201), the charge control unit 202 charges the power storage unit 105 in power outage preparatory charge in which the power storage unit 105 is charged till reaching the total charge capacity (Step S105).

The processing performed after the normal charge and the power outage preparatory charge is substantially the same as that in Embodiment 1.

As described above, the power outage information is obtained. Hence, even when the power outage preparatory switch 106 is not turned on or off by the user, by switching as necessary between the normal charge in which the power storage unit 105 is charged to a predetermined charge rate and the power outage preparatory charge in which the power storage unit 105 is charged to the total charge capacity without suppressing the charging, it is possible to prevent performance and life of the power storage unit 105 from degrading, and to secure sufficient power for operating the distribution board when necessary.

In Embodiment 2, the power outage preparatory switch 106 is included which is turned on and off by the user, but the present invention is not limited to the example. For example, it may be that the power outage preparatory switch 106 is not included.

Furthermore, in Embodiment 2, the power outage information obtaining unit 201 obtains power outage information indicating schedule of power outage from a power company and the like via a network, but the present invention is not limited to the example. For example, it may be that the power outage information obtaining unit 201 obtains calendar information such as typhoon season, the charge control unit 202 performs power outage preparatory charge in the typhoon season, and performs normal charge in seasons other than the typhoon season. In addition, for example, it may be that the power outage information obtaining unit 201 obtains information about thunder alert or warning or heavy rain alert or warning, and when such an alert or warning is issued, the charge control unit 202 performs the power outage preparatory charge, and when the alert or warning is not issued, the charge control unit 202 performs the normal charge.

Embodiment 3

In Embodiment 3, a description is given of a configuration of the power storage unit 105 in the main distribution board 101 in the distribution board 100 illustrated in FIG. 1.

FIG. 8A and FIG. 8B are perspective views of external appearance of the main distribution board 101 according to Embodiment 3. FIG. 8A illustrates a state where two storage batteries (battery packs) are housed, and FIG. 8B illustrates a state where one of the storage batteries (battery packs) has been removed. The same referential numbers are assigned to the structural elements that are substantially the same as those in Embodiment 1, and descriptions thereof are not given.

The power storage unit 105 includes two storage batteries (battery packs) housed in a pack housing unit 165 as illustrated in FIG. 8A. In the power storage unit 105, one storage battery (battery pack) 161a is removable from the main distribution board 101 as illustrated in FIG. 8B.

For example, the storage battery 161a includes a terminal 162 such as a universal serial bus (USB) terminal.

The main distribution board 101 includes connecting terminals 160. When the connecting terminals 160 are connected to the connecting terminals of the storage battery 161a (not illustrated), the power storage unit 105 is charged by using power supplied from the power system 11.

With such a configuration, during power outage or the like, the storage battery 161a can be removed from the main distribution board 101 to be carried to a place which needs the storage battery 161a. Then, it is possible to charge a mobile device 300 such as a smart phone or a tablet terminal, via a cable 301 such as a USB cable.

Embodiment 4

Figure 9:
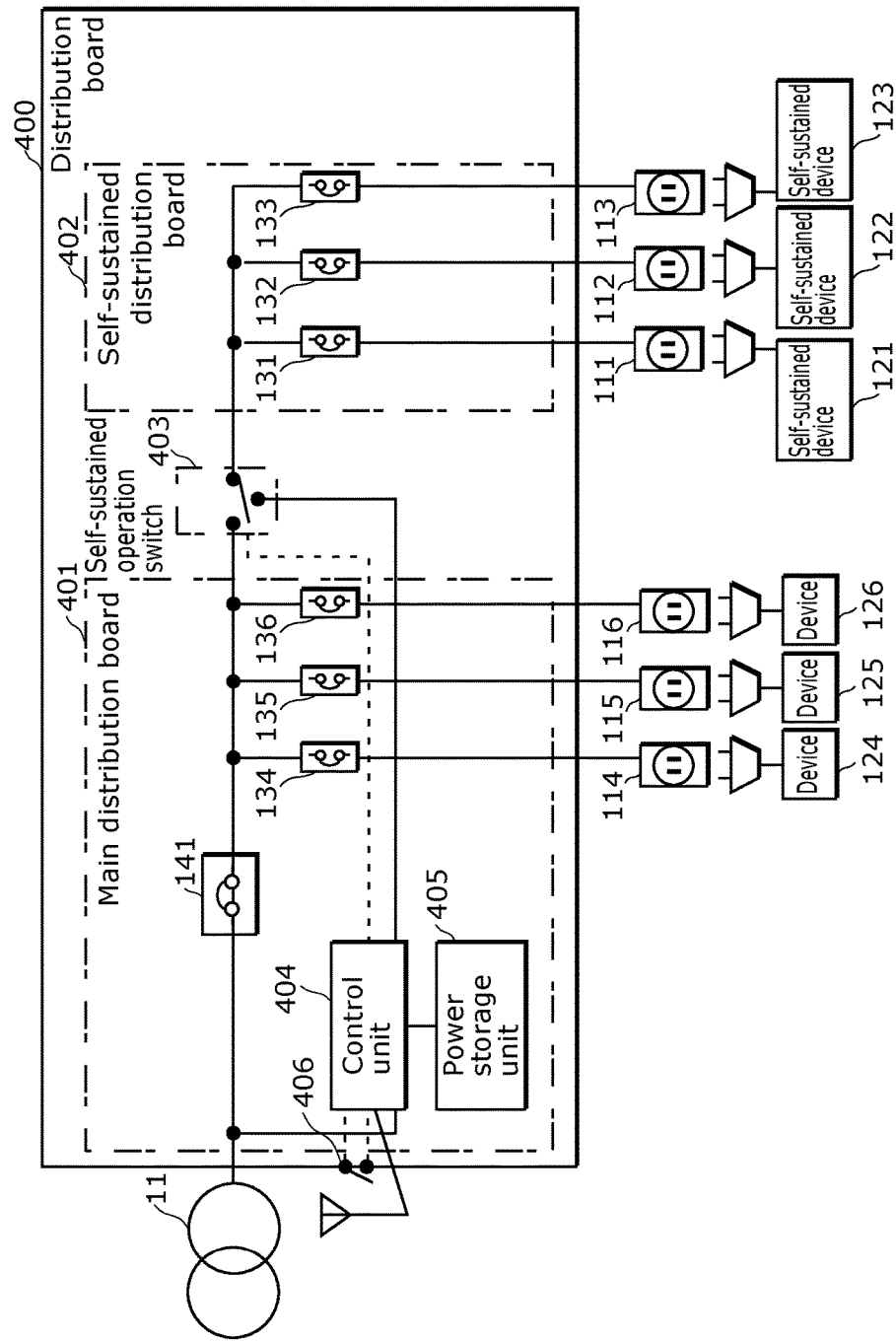
FIG. 9 illustrates a configuration of a power supply system which includes a distribution board according to Embodiment 4.

FIG. 9 illustrates a configuration of a power supply system which includes a distribution board according to Embodiment 4. The same referential numbers are assigned to the structural elements that are substantially the same as those in Embodiment 1 illustrated in FIG. 1, and descriptions thereof are not given.

A power supply system 20 illustrated in FIG. 9 supplies power to devices 124 to 126 and self-sustained devices 121 to 123. Hereinafter, specific descriptions are given of each structural element illustrated in FIG. 9.

A distribution board 400 is a distribution board which controls supply of power that is supplied from the power system 11, to loads (the devices 124 to 126 and the self-sustained devices 121 to 123) in a building. When no power is supplied from the power system 11, the distribution board 400 supplies, to the self-sustained devices 121 to 123, power supplied from a storage battery unit (battery pack). The distribution board 400 includes, as illustrated in FIG. 9, a main distribution board 401, a self-sustained distribution board 402, and a self-sustained operation switch 403.

The main distribution board 401 includes a branch circuit, and controls supply, to the devices 124 to 126, power supplied from the power system 11. The main distribution board 401 also includes a control unit 404, a power storage unit 405, a mode switch 406, breakers 134 to 136, and a main breaker 141.

The self-sustained distribution board 402 is an additional distribution board which includes a branch circuit, and supplies, to the self-sustained devices 121 to 123, power that is supplied via the self-sustained operation switch 403. In other words, the self-sustained distribution board 402 supplies, to the self-sustained devices 121 to 123, power that is supplied from the power system 11 or power that is supplied from the storage battery unit (battery pack). In particular, the self-sustained distribution board 402 supplies power to the self-sustained devices 121 to 123 even when no power is supplied from the power system 11. The self-sustained distribution board 402 includes breakers 131 to 133.

The self-sustained operation switch 403 is a switch for switching between supply of power from the power system 11 (grid connection mode) or supply of power from the power storage unit (battery pack) (self-sustained operation mode). For example, while power is supplied from the power system 11, power that is supplied from the power system 11 is supplied. On the other hand, while no power is supplied from the power system 11, power that is supplied from the storage battery unit (battery pack) is supplied.

The control unit 404 externally obtains signals, detects power outage, and controls an operation of the distribution board 400 as described later.

The mode switch 406 is a switch for manually selecting the grid connection mode or the self-sustained operation mode.

The power storage unit 405 includes two storage batteries (battery packs) 161 housed in a pack housing unit 165 as illustrated in FIG. 8A according to Embodiment 3, for example. The pack housing unit 165 includes connecting units (connecting terminals 160 illustrated in FIG. 8B) that are connectable to and disconnectable from the connecting terminals (not illustrated) of the battery pack 161. When the battery pack 161 is housed in the pack housing unit 165 and the connecting terminals 160 of the pack housing unit 165 are connected to the connecting terminals of the battery pack 161, the power storage unit 405 (battery pack 161) is charged by using the power supplied from the power system 11 and power is supplied from the power storage unit 405 (the battery pack 161). The number of the storage batteries (battery packs) is not limited to two, but may be, for example, three or more.

Each battery pack 161 includes a display unit (not illustrated in FIG. 8B) which displays the remaining power level of the battery pack, and is housed in the pack housing unit 165 in an orientation that allows the display unit to be viewed while being connected to the connecting terminals 160.

Figure 10:
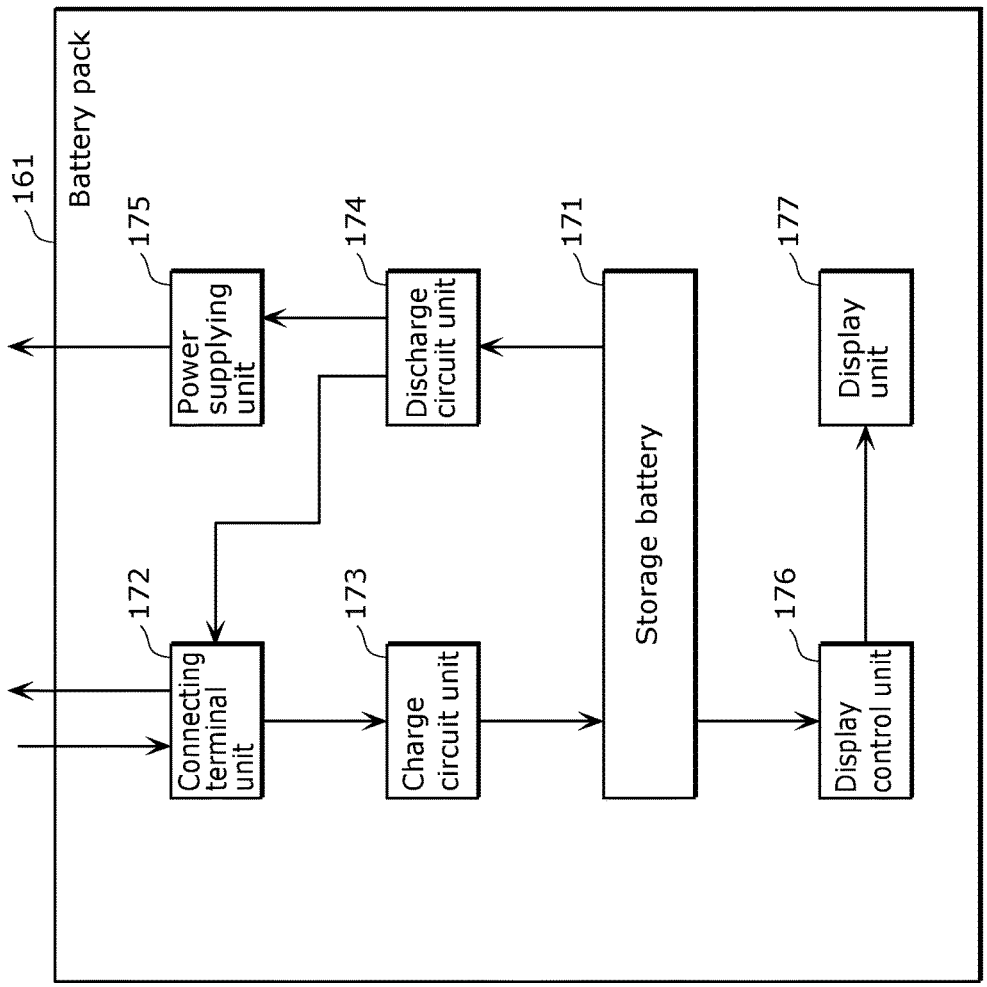
FIG. 10 is a block diagram illustrating a detailed configuration of a battery pack according to Embodiment 4.

FIG. 10 is a block diagram illustrating a detailed configuration of the battery pack 161 according to Embodiment 4.

As illustrated in FIG. 10, the battery pack 161 includes one or more storage batteries 171, a connecting terminal unit 172, a charge circuit unit 173, a discharge circuit unit 174, a power supplying unit 175, a display control unit 176, and a display unit 177.

Each storage battery 171 accumulates supplied power, and discharges the accumulated power.

The connecting terminal unit 172 is mechanically and electrically connectable to and disconnectable from the distribution board 400, and is for charge and discharge of power.

The charge circuit unit 173 charges the storage battery 171 by using power provided from the power system 11 via the connecting terminal unit 172.

The discharge circuit unit 174 provides power discharged from the storage battery 171.

The power supplying unit 175 supplies power provided from the discharge circuit unit 174, to an other device, such as the mobile device 300 illustrated in FIG. 8B, by being electrically connected to the other device. More specifically, the power supplying unit 175 is formed as a terminal 162 such as a USB terminal (USB port) illustrated in FIG. 8B, for example.

The display control unit 176 obtains the remaining power level of the storage battery 171, and displays the remaining power level on the display unit 177.

Examples of the display unit 177 includes a liquid crystal display (LCD) device, and a light emitting diode (LED) display. The display unit 177 is used for displaying the remaining power level of the battery pack 161 (the storage battery 171).

Figure 11:
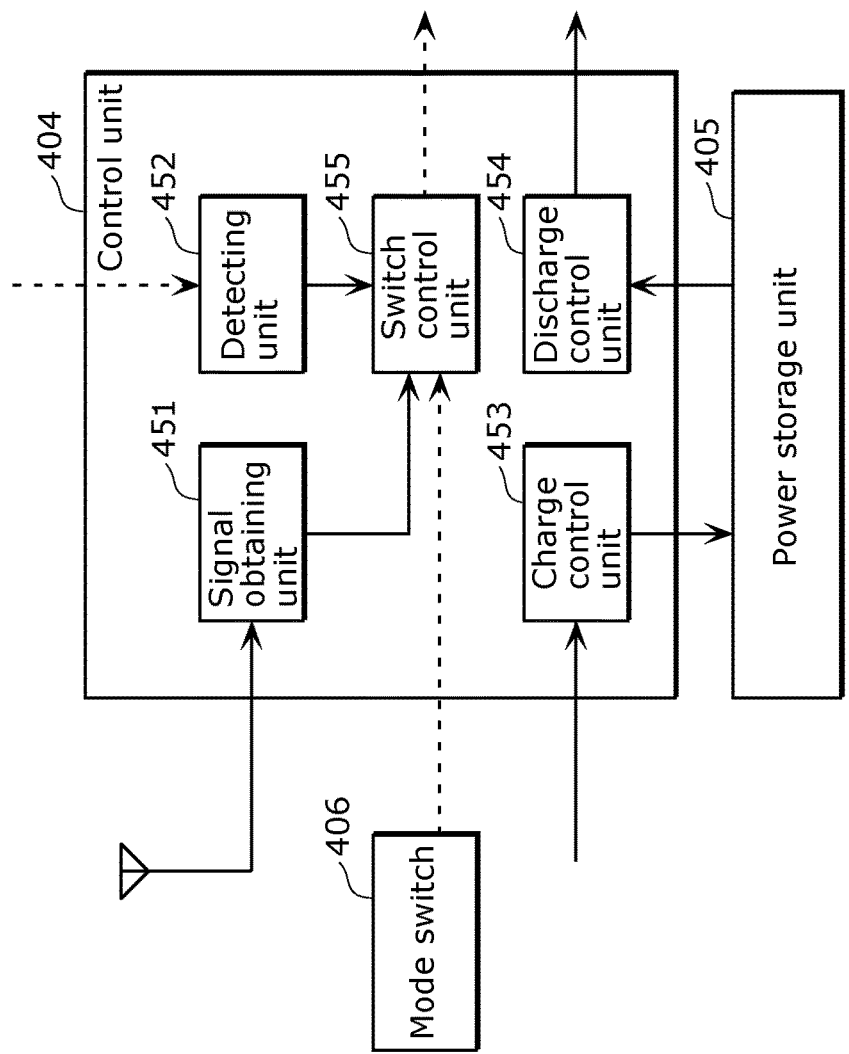
FIG. 11 is a block diagram illustrating a detailed configuration of a control unit in a distribution board according to Embodiment 4.

Next, a description is given of a detailed configuration of the control unit 404. FIG. 11 is a block diagram illustrating a detailed configuration of the control unit 404 in the distribution board 400 according to Embodiment 4.

The control unit 404 includes, as illustrated in FIG. 11, a signal obtaining unit 451 (receiver), a detecting unit 452, a charge control unit 453, a discharge control unit 454 (AC/DC inverter), and a switch control unit 455.

The signal obtaining unit 451 externally obtains, for example, signals such as a control signal indicating which one of the grid connection mode and the self-sustained operation mode is to be selected, and a power saving request signal.

The detecting unit 452 detects power outage that is a state where no power is supplied from the power system 11.

The charge control unit 453 converts AC power supplied from the power system 11 to DC power, and supplies the DC power to the power storage unit 405 for charge. In other words, the charge control unit 453 charges the battery pack 161. More specifically, the charge control unit 453 includes an AC/DC converter.

The charge control unit 453 obtains information about the remaining power level of the battery pack by communicating with the battery pack. When the remaining power level is below a threshold value in the grid connection mode, the charge control unit 453 supplies, to the battery pack, the power that is supplied from the power system 11, to charge the battery pack. When the remaining power level is above or equal to the predetermined threshold value in the grid connection mode, the charge control unit 453 does not supply, to the battery pack, power that is supplied from the power system.

The discharge control unit 454 converts DC power supplied from the power storage unit 405 into AC power, and supplies the AC power to the self-sustained operation switch 403. More specifically, the discharge control unit 454 includes a DC/AC inverter.

The switch control unit 455 controls the self-sustained operation switch 103 based on the information detected by the detecting unit 452, and switches between the grid connection mode and the self-sustained operation mode. More specifically, when the detecting unit 452 detects that power is being supplied from the power system 11 (nonpower outage state), the switch control unit 455 selects the grid connection mode. When the detecting unit 452 detects that power is not being supplied from the power system 11 (power outage state), the switch control unit 455 selects the self-sustained operation mode.

The switch control unit 455 controls the self-sustained operation switch 103 according to the mode selected by the mode switch 406, and switches between the grid connection mode and the self-sustained operation mode.

The switch control unit 455 further controls the self-sustained operation switch 103 based on the signal obtained by the signal obtaining unit 451, and switches between the grid connection mode and the self-sustained operation mode. For example, when the signal obtained by the signal obtaining unit 451 is a control signal indicating which one of the grid connection mode and the self-sustained operation mode is to be selected, the switch control circuit 455 controls the self-sustained operation switch 103 according to the mode indicated by the control signal, and switches between the grid connection mode and the self-sustained operation mode. When the signal obtained by the signal obtaining unit 451 is a power saving request signal, the switch control circuit 455 controls the self-sustained operation switch 103 and switches from the grid connection mode to the self-sustained operation mode.

When at least one of battery packs is removed while power is being supplied from the battery packs to the self-sustained devices (emergency devices) in the self-sustained operation mode, the switch control unit 455 continuously supply power to the self-sustained devices using the remaining battery packs.

A specific description is given below of an operation of the power supply system 20 performed when power is supplied from the power system 11 (grid connection mode), and when power is supplied from the power storage unit 405 (battery pack) (self-sustained operation mode).

First, in the grid connection mode, the power system 11 supplies power to the main distribution board 401. The main distribution board 401 supplies power to the devices 124 to 126. The main distribution board 401 also supplies power to the self-sustained distribution board 402 via the self-sustained operation switch 403. The self-sustained distribution board 402 supplies power to the self-sustained devices 121 to 123.

On the other hand, in the self-sustained operation mode, the power storage unit 405 (battery pack) does not supply power to the main distribution board 101. The power storage unit 405 (battery pack) supplies power to the self-sustained distribution board 102 via the self-sustained operation switch 103. The self-sustained distribution board 102 supplies power to the self-sustained devices 121 to 123.

As described above, since the distribution board 400 includes the power storage unit 405 (battery pack), the power supply system 20 can supply power to the self-sustained devices 121 to 123 both in the grid connection mode and in the self-sustained operation mode.

In Embodiment 4, the charge control unit 453 is separated from the discharge control unit 454, but the present invention is not limited to the example. It may be that the charge control unit 453 and the discharge control unit 454 may be configured as one unit. In such a case, a bidirectional converter is included which converts AC power to DC power and DC power to AC power.

Although the distribution board and the battery pack according to one or more embodiments have been described based on the embodiments, the present invention is not limited to these embodiments. Various modifications to the embodiments that may be conceived by those skilled in the art and combinations of structural elements in different embodiments may be included within the scope of one or more aspects of the present invention, without departing from the spirit of the present invention.

INDUSTRIAL APPLICABILITY

According to the present invention, it is possible to secure sufficient power for operating a distribution board during power outage in which no power is supplied from a power system, and have wider use of the secured power. The present invention is useful in distribution board, a battery pack, a power supply system including a distribution board, and household equipment and the like which includes a distribution board.

REFERENCE SIGNS LIST 10, 20 Power supply system
11 Power system
12 Power conditioner (PCS)
13 Photovoltaic panel (PV panel)
14 Fuel cell (FC)
15 Storage battery (SB)
100, 400 Distribution board
101, 401 Main distribution board
102, 402 Self-sustained distribution board
103, 403 Self-sustained operation switch
104, 200, 404 Control unit
105, 405 Power storage unit
106 Power outage preparatory switch
111, 112, 113 Self-sustained outlet
114, 115, 116 Outlet
121, 122, 123 Self-sustained device
124, 125, 126 Device
131, 132, 133, 134, 135, 136, 142, Breaker
141 Main breaker
143 Relay
144 Current transformer (CT)
151, 202, 453 Charge control unit
152, 452 Detecting unit
153, 455 Switch control unit
160 Connecting terminal
161, 161a, 161b Storage battery (battery pack)
162 Terminal
165 Pack housing unit
171 Storage battery
172 Connecting terminal unit
173 Charge circuit unit
174 Discharge circuit unit
175 Power supplying unit
176 Display control unit
177 Display unit
201 Power outage information obtaining unit
300 Mobile device
301 Cable
406 Mode switch
451 Signal obtaining unit
454 Discharge control unit

The invention claimed is:
1. A power storage system comprising:
a power storage unit which includes one or more batteries;
a signal receiver which externally receives a signal;

a charge controller which converts AC power supplied from a power system into DC power, and supplies the DC power to the one or more batteries to charge the one or more batteries; and a switching controller which switches between a first mode and a second mode according to the signal received by the signal receiver, the first mode being a mode in which the AC power supplied from the power system is supplied to a load and the second mode being a mode in which electric power is supplied to the load by using electric power charged in the one or more batteries, wherein the signal received by the signal receiver is a power saving request signal, and the switching controller switches from the first mode to the second mode when the signal receiver receives the power saving request signal.

2. The power storage system according to claim 1, comprising a discharge controller which converts the DC power in the one or more batteries into AC power, wherein, when the switching controller switches a mode into the second mode, electric power discharged from the one or more batteries is supplied to the load via the discharge controller.

3. The power storage system according to claim 1, wherein the signal received by the signal receiver is a control signal indicating which one of the first mode and the second mode is to be selected, and the switching controller switches between the first mode and the second mode according to the mode indicated by the control signal.

4. The power storage system according to claim 1, wherein, when a remaining power level of the one or more batteries is below a predetermined threshold value in the first mode, the charge controller charges the one or more batteries by supplying, to the one or more batteries, the electric power supplied from the power system, and when the remaining power level is above or equal to the predetermined threshold value, the charge controller stops supplying, to the one or more batteries, the electric power supplied from the power system.

5. The power storage system according to claim 1, further comprising a detector which detects whether or not electric power is being supplied from the power system, wherein the switching controller selects the first mode when the detector detects that electric power is being supplied from the power system, and selects the second mode when the detector detects that no electric power is being supplied from the power system.

6. The power storage system according to claim 1, further comprising a mode switch for selecting the first mode or the second mode, wherein the switching controller switches between the first mode and the second mode according to the mode selected by the mode switch.

7. The power storage system according to claim 1, wherein each of the one or more batteries is a battery pack, the power storage system further comprises:

a connecting unit connectable to and disconnectable from a connecting terminal unit of the battery pack; and a pack housing which houses the battery pack and includes the connecting unit.

8. The power storage system according to claim 7, wherein the battery pack includes a display which displays a remaining power level of the battery pack, and the pack housing houses the battery pack in an orientation that allows the display of the battery pack connected to the connecting unit to be viewed.

9. The power storage system according to claim 7, wherein the connecting unit comprises a plurality of connecting units, and a plurality of the battery packs are connected to the plurality of the connecting units, respectively.

10. The power storage system according to claim 9, wherein, when at least one of the battery packs is removed while electric power is supplied from the battery packs to the load, the switching controller continuously supplies electric power to the load by using the battery packs excluding the at least one battery pack that has been removed.

11. A power storage system control method comprising:

externally obtaining a signal;

converting AC power supplied from a power system into DC power, and supplying the DC power to a battery to charge the battery; and switching between a first mode and a second mode according to the signal obtained in the obtaining, the first mode being a mode in which the AC power supplied from the power system is supplied to a load and the second mode being a mode in which electric power is supplied to the load by using electric power charged in the battery, wherein the signal obtained is a power saving request signal, and in the switching, the first mode is switched to the second mode when the power saving request signal is obtained.

12. A power storage system comprising:

a power storage unit which includes one or more batteries;

a signal receiver which externally receives a signal;

a charge controller which converts AC power supplied from a power system into DC power, and supplies the DC power to the one or more batteries to charge the one or more batteries; and a switching controller which switches between a first mode and a second mode according to the signal received by the signal receiver, the first mode being a mode in which the AC power supplied from the power system is supplied to a load, the second mode being a mode in which electric power is supplied to the load by using electric power charged in the one or more batteries, wherein each of the one or more batteries is a battery pack, and the power storage system further comprises:

a connecting unit connectable to and disconnectable from a connecting terminal unit of the battery pack; and a pack housing which houses the battery pack and includes the connecting unit.

13. A power storage system control method for a power storage system, the power storage system including a power storage unit which includes one or more batteries, the method comprising:

receiving externally, using a signal receiver, a signal;

using a charge controller, converting AC power supplied from a power system into DC power and supplying the DC power to the one or more batteries to charge the one or more batteries; and switching, using a switching controller, between a first mode and a second mode according to the signal received by the signal receiver, the first mode being a mode in which the AC power supplied from the power system is supplied to a load and the second mode being a mode in which electric power is supplied to the load by using electric power charged in the one or more batteries, wherein each of the one or more batteries is a battery pack, and the method further comprising:

connecting the power storage system to and disconnecting the power storage system from a connecting terminal unit of the battery pack using a connecting unit; and housing the battery pack and the connecting unit in a pack housing.

14. A distribution board comprising:

a power line for supplying, to a load, AC power that is supplied from a power system;

a pack housing which houses a battery pack and includes a connecting unit, the battery pack including a connecting terminal unit for charge and discharge, the connecting unit being connectable to and disconnectable from the connecting terminal unit of the battery pack; and an AC/DC converter which converts the AC power supplied from the power system into DC power, and supplies the DC power to the battery pack housed in the pack housing to charge the battery pack, wherein the load comprises a plurality of loads including a normal load and an emergency load, the distribution board further comprises:

a DC/AC inverter which converts, into AC power, the DC power discharged from the battery pack via the connecting unit, and supplies the AC power to the load; and a switching controller which switches between a grid connection mode and a self-sustained operation mode, the grid connection mode being a mode in which the AC power supplied from the power system is supplied to at least the normal load, the self-sustained operation mode being a mode in which electric power discharged from the battery pack is supplied to at least the emergency load via the DC/AC inverter, the distribution board further comprises:

a receiver which externally receives a control signal, wherein the switching controller switches between the grid connection mode and the self-sustained operation mode according to the control signal received by the receiver.

15. A distribution board comprising:

a power line for supplying, to a load, AC power that is supplied from a power system;

a pack housing which houses a battery pack and includes a connecting unit, the battery pack including a connecting terminal unit for charge and discharge, the connecting unit being connectable to and disconnectable from the connecting terminal unit of the battery pack; and an AC/DC converter which converts the AC power supplied from the power system into DC power, and supplies the DC power to the battery pack housed in the pack housing to charge the battery pack, wherein the load comprises a plurality of loads including a normal load and an emergency load, the distribution board further comprises:

a DC/AC inverter which converts, into AC power, the DC power discharged from the battery pack via the connecting unit, and supplies the AC power to the load; and a switching controller which switches between a grid connection mode and a self-sustained operation mode, the grid connection mode being a mode in which the AC power supplied from the power system is supplied to at least the normal load, the self-sustained operation mode being a mode in which electric power discharged from the battery pack is supplied to at least the emergency load via the DC/AC inverter, the distribution board further comprises:

a charge controller which controls charge of the battery pack, wherein the charge controller obtains information about a remaining power level of the battery pack by communicating with the battery pack, and when the remaining power level is below a predetermined threshold value in the grid connection mode, the charge controller charges the battery pack by supplying, to the battery pack, the electric power supplied from the power system, and when the remaining power level is above or equal to the predetermined threshold value, the charge controller stops supplying, to the battery pack, the electric power supplied from the power system.

16. A method for a distribution board comprising:

supplying to a load, using a power line, AC power that is supplied from a power system;

housing, using a pack housing that includes a connecting unit, a battery pack, the battery pack including a connecting terminal unit for charge and discharge, the connecting unit being connectable to and disconnectable from the connecting unit of the battery pack; and converting, using an AC/DC converter, the AC power supplied from the power system into DC power, and supplying the DC power to the battery pack housed in the pack housing to charge the battery pack, wherein the load comprises a plurality of loads including a normal load and an emergency load, the method further comprising:

converting using a DC/AC inverter, into AC power, the DC power discharged from the battery pack via the connecting unit, and supplying the AC power to the load; and switching, using a switching controller, between a grid connection mode and a self-sustained operation mode, the grid connection mode being a mode in which the AC power supplied from the power system is supplied to at least the normal load, and the self-sustained operation mode being a mode in which electric power discharged from the battery pack is supplied to at least the emergency load via the DC/AC inverter, and the method also further comprising:

externally receiving, using a receiver, a control signal, and wherein the switching controller switches between the grid connection mode and the self-sustained operation mode according to the control signal received by the receiver.

17. A method for a distribution board comprising:

supplying to a load, using a power line, AC power that is supplied from a power system;

housing, using a pack housing that includes a connecting unit, a battery pack, the battery pack including a connecting terminal unit for charge and discharge, the connecting unit being connectable to and disconnectable from the connecting terminal unit of the battery pack; and converting, using an AC/DC converter, the AC power supplied from the power system into DC power, and supplying the DC power to the battery pack housed in the pack housing to charge the battery pack, wherein the load comprises a plurality of loads including a normal load and an emergency load, the method further comprising:

converting using a DC/AC inverter, into AC power, the DC power discharged from the battery pack via the connecting unit, and supplying the AC power to the load; and switching, using a switching controller, between a grid connection mode and a self-sustained operation mode, the grid connection mode being a mode in which the AC power supplied from the power system is supplied to at least the normal load, and the self-sustained operation mode being a mode in which electric power discharged from the battery pack is supplied to at least the emergency load via the DC/AC inverter, and the method further comprising:

controlling, using a charge controller which, charge of the battery pack, wherein the charge controller obtains information about a remaining power level of the battery pack by communicating with the battery pack, and when the remaining power level is below a predetermined threshold value in the grid connection mode, the charge controller charges the battery pack by supplying, to the battery pack, the electric power supplied from the power system, and when the remaining power level is above or equal to the predetermined threshold value, the charge controller stops supplying, to the battery pack, the electric power supplied from the power system.

* * * * *